United States Patent Office 3,079,180
Patented Feb. 26, 1963

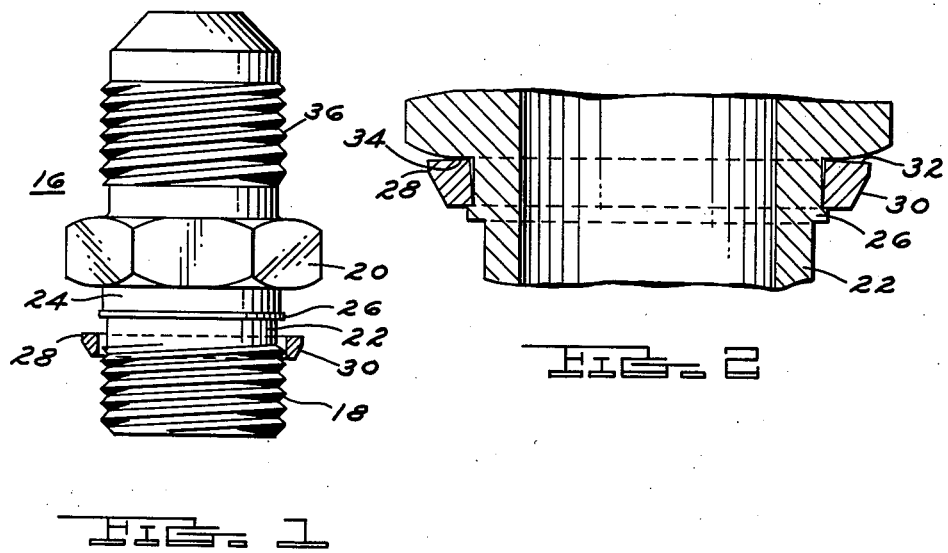
FIG. 1
FIG. 2
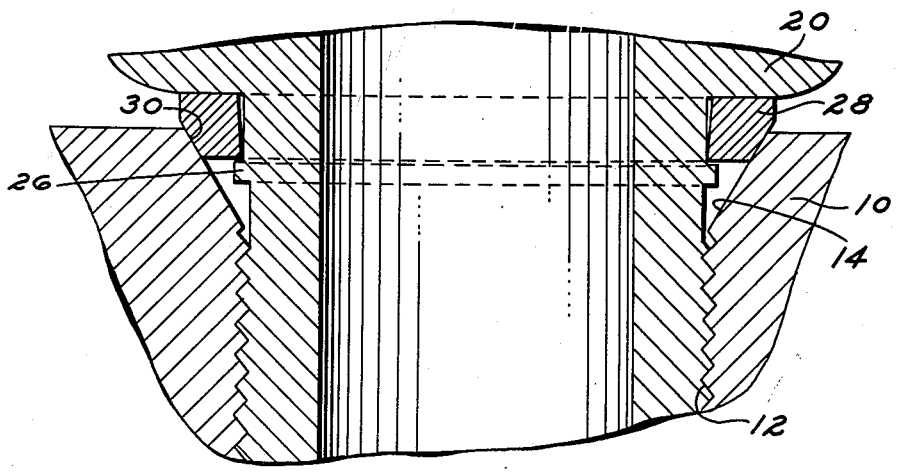
FIG. 3
INVENTOR.
GILBERT T. LYON
BY
Burton & Parker
ATTORNEYS

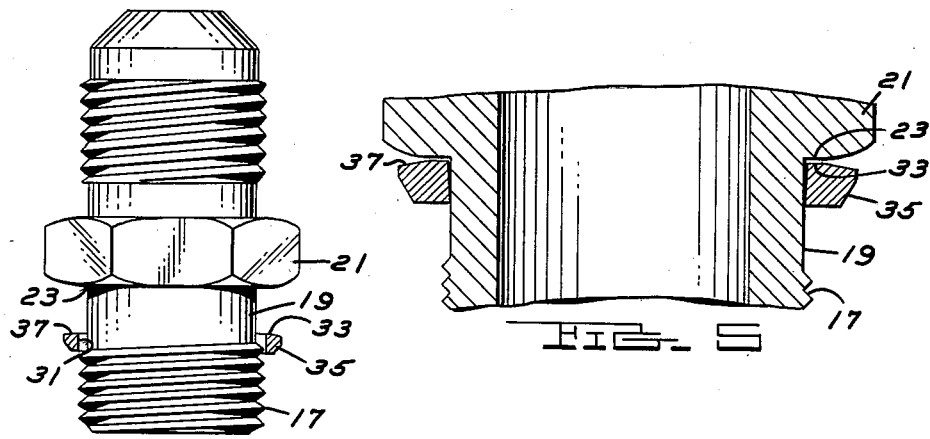
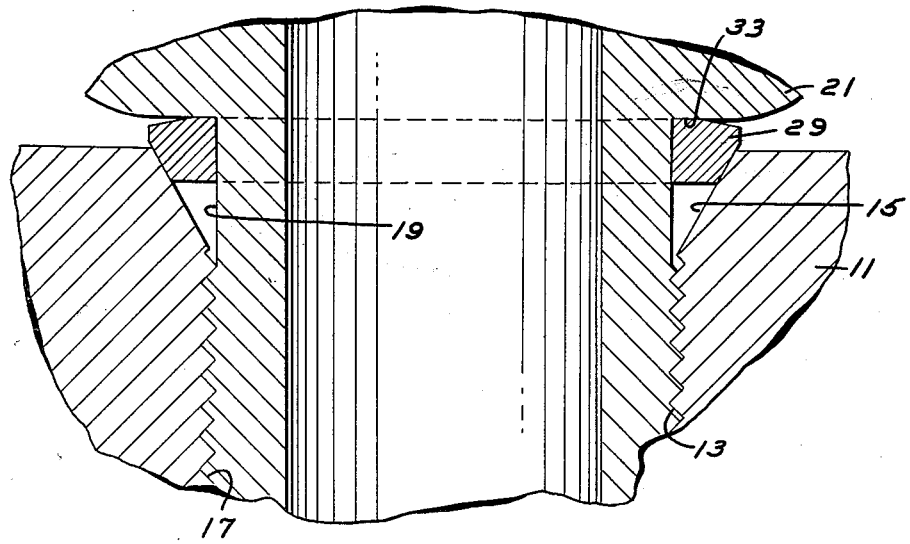
INVENTOR.
GILBERT T. LYON
BY
Burton & Parker
ATTORNEYS

3,079,180
TUBULAR COUPLING HAVING A METALLIC
SEALING RING
Gilbert T. Lyon, Royal Oak, Mich.
Filed Apr. 4, 1958, Ser. No. 726,359
5 Claims. (Cl. 285—220)

This invention relates to an improved type of tubular coupling particularly designed for high pressure hydraulic systems. It is adapted to be connected in the hydraulic system and to maintain a tight seal at its connection therewith.

This application is a continuation-in-part of application Serial No. 597,758 filed July 13, 1956, and now abandoned.

An object is to provide a tubular coupling of the character described comprising a tubular fitting both ends of which are adapted to be connected into the system. One end of the fitting is adapted to be received within a threaded port of a member which forms a part of the system. The fitting is provided with a sealing ring and the port into the member is provided with a beveled entrance wall and the sealing ring is adapted to form a tight sealing connection between the beveled entrance to the port and the body of the fitting when the fitting is threaded into the port.

A meritorious feature is the provision of a coupling of the character described comprising a fitting having an externally threaded length adjacent to one end and an unthreaded length adjacent to the inner end of the threaded length and disposed between the threaded length and an enlarged portion of the fitting of greatest diameter than the unthreaded length and provided with a radial sealing face adjacent to the unthreaded length. A continuous resiliently contractible and deformable metal sealing ring is mounted upon the unthreaded length of the fitting and held captive thereon through having an internal diameter less than the external diameter of the threaded length and less than the external diameter of the enlarged portion of the fitting. This ring is sufficiently oversize the unthreaded length to permit rotation of the fitting therein. The sealing ring is adapted upon being compressed between the radial sealing face, the unthreaded length of the fitting, and the beveled entrance to the port to form a tight seal between the fitting and the port into which it is received.

Another object is the provision of a coupling of the character described wherein a resiliently deformable and contractible metal sealing ring has an initial internal diameter sufficient to permit the ring to be passed over the threaded length of the fitting onto the unthreaded length thereof and the ring is then swaged upon the unthreaded length until it presents an internal diameter less than the diameter of the threaded length whereby the ring is held captive upon the fitting.

A feature of importance is that the ring is resistingly resiliently contractible and deformable upon the unthreaded length of the fitting so that when the fitting is threaded into a port as defined, the ring is compressed between the radial sealing face of the fitting and the unthreaded length of the fitting and the beveled wall of the port forming a tight seal therewith, but when the fitting is withdrawn outwardly of the port, the ring springs back away from the unthreaded length of the fitting so as to permit free rotation of the fitting within the ring. The fitting may therefore be re-used in separate locations as the ring functions satisfactorily to form successive seals.

A feature of one embodiment is the provision of a fitting of the character described wherein the unthreaded length which lies between the threaded length and a non-circular enlarged portion of the fitting has a portion of minimum diameter adjacent to the threaded length of a portion of maximum diameter adjacent to the non-circular enlarged portion, and wherein the sealing ring is rotatably mounted upon the unthreaded length portion of maximum diameter and held captive thereupon by a radially projecting ridge of said maximum diameter portion, and wherein such ring provides a seal between the fitting and the bore of a member within which the fitting is threaded when the fitting is threaded down therein.

Other objects, advantages and meritorious features will more fully appear from the following specification, appended claims and accompanying drawings, wherein:

FIG. 1 is an elevation of a fitting embodying the invention but with a sealing ring in section and in process of installation upon the fitting;

FIG. 2 is a sectional view through a portion of the fitting showing the sealing ring assembled thereupon;

FIG. 3 is a sectional view of the fitting received within the threaded bore of a part and with the sealing ring occupying its sealing position;

FIG. 4 is an elevation of a fitting embodying the invention in a modified form as compared with FIG. 1;

FIG. 5 is a cross sectional view through a portion of the fitting shown in FIG. 4; and, FIG. 6 is a cross sectional view similar to FIG. 3 but showing the fitting and ring illustrated in FIGS. 4 and 5.

This invention relates to a tubular connection wherein a tubular fitting is provided with a resilient, deformable metal sealing ring which is adapted upon threading of the fitting into the threaded bore of a member to form a fluid tight seal between the member and the fitting. Heretofore I have filed applications for tubular couplings designed for a generally similar use. One application related to a tubular fitting provided with a captive lock nut having a portion adapted to form a seal between the fitting and the bore of a member within which the fitting was threaded, being application Serial No. 590,745 filed June 11, 1956. Another application related to a specific shape of captive sealing ring interposed between a lock nut threaded on the fitting and the bore of a member within which the fitting was threaded, being application Serial No. 508,419 filed May 16, 1955. Both of these applications were abandoned and subject matter therefrom consolidated in U.S. application Serial No. 833,239 filed August 12, 1959, now U.S. Patent No. 3,003,795. A third application related to a specific form of nut and the fitting structure, being application Serial No. 597,740 filed July 13, 1956, now U.S. Patent No. 2,942,895.

In the instant construction in FIGS. 1, 2 and 3 a member 10 is shown as provided with an internally threaded bore 12. The entrance to the bore is defined by a beveled wall 14. This member may be any suitable part of a high pressure fluid system which is adapted to be coupled with the remainder of the system through the employment of a tubular fitting received therein. The tubular fitting is indicated as 16 in FIG. 1. Such fitting is threaded at one end as at 18 and includes a non-circular wrench-engaging portion 20 which may be of a hexagonal shape. This hexagonal shape has a flat circumferential radial outwardly extending sealing face 34.

This hexagonal portion 20 is spaced from the threaded length 18 by an unthreaded length of the fitting. The unthreaded length of the fitting includes a portion 22 of minimum diameter adjacent to the threaded length 18 and a shoulder portion 24 of greater diameter adjacent to the hex portion 20. The shoulder portion 24 is provided with an abutment or ridge 26, as shown in FIG. 1, which ridge separates the shoulder 24 from the minimum diameter portion 22.

The diameter of the ridge 26 is illustrated as approximately that of the threaded length 18 of the fitting. The diameter of the shoulder is less than that of the ridge by what in practice in a certain size of fitting might be approximately .005". The sealing ring with which the fitting is provided is adapted to be held captive upon the shoulder by the ridge 26 as shown in the figures of the drawing.

The fitting itself would be formed of suitable metal such as steel and the ring might well be formed of the same material. The ring is indicated as 28. Initially the ring has a diameter sufficient to permit it to be passed over the threaded length 18 of the fitting, as shown in FIG. 1, and over the ridge 26 on the shoulder 24. It is a continuous ring. Its internal diameter is merely sufficient to permit it to be passed over the threaded length, as, for example, .001" or .002" greater than the external diameter of the threaded length. Inasmuch as the ridge 26 has approximately the same external diameter as that of the threaded length 18 the ring freely passes over the ridge until it superimposes in encircling relationship the shoulder 24.

The ring when disposed upon the shoulder 24 is contracted or swaged inwardly, reducing its internal diameter to a point that while permitting rotation of the fitting within the ring, such ring has an internal diameter sufficiently less than that of the ridge so that it is held captive upon the shoulder. The ring might well be swaged until it exhibited an internal diameter of only .001" or .002" beyond that of the shoulder 24.

As the ring is swaged inwardly its forward edge may be contracted to a greater degree than its rear edge, as shown in FIG. 2. FIGS. 2 and 3, however, exaggerate the clearance because of the small dimensions involved.

After the ring has been swaged and contracted as shown in FIG. 2 it will be held captive upon the fitting. The ring exhibits an outer beveled face 30 which is beveled to such an angle that it corresponds substantially with the beveled face 14 of the bore so that the beveled faces fit flat against each other, as shown in FIG. 3. The inner end face 32 of the ring which is opposed to the flat face 34 of the hexagonal portion 20 of the fitting is a flat face. It is approximately parallel to the correspondingly flat face 34. When the fitting has been threaded into the bore, as shown in FIG. 3, the flat face 32 of the ring and the flat face 34 of the hex 20 are brought into abutment, as illustrated in FIG. 3, and the ring is compressed between the beveled face 30 of the bore, the flat face 34 of the hex and the unthreaded length of the shoulder 24. The ring is resistingly deformed and contracted about the shoulder 24 until it seats thereabout.

The ring is sufficiently resilient that when the pressure is released by unthreading the fitting from the bore, the ring springs back away from the fitting so that the fitting may be threaded into another bore and the ring will again function in a satisfactory manner. In the theading of the fitting into a bore, the fitting rotates within the ring and the ring is frictionally held to its seat within the bore. The ring forms a seal with the beveled face of the bore, with the unthreaded shoulder and with the flat face 34 of the hexagonal shape. It is desirable that the abutting sealing faces be finished to at least as good as a 10 micro inch finish or better.

The fitting may as shown be provided with an opposite end extension 36 which is threaded as shown in FIG. 1. Such end of the fitting may be coupled with any internally threaded member of the system. In use the threaded end 18 of the fitting may be threaded into an internally threaded bore 12 of a part as shown in FIG. 3 and the beveled face 30 of the ring will be brought into contact with the beveled face 14 of the bore. These beveled faces form a tight seal which precludes the leakage of fluid therebetween. The flat inner face 32 of the ring is also brought into tight sealing engagement with the corresponding flat face 34 of the hex and forms a fluid-tight seal therebetween.

It will be apparent that the fitting is threaded into the bore and the beveled faces 14 and 30 of the bore and ring respectively are brought into engagement the flat inner face 32 of the ring is not only urged against the flat face 34 of the hex 20 but the ring is also constricted inwardly against the fitting. As shown in FIG. 3, the ring is constricted along the forward inner edge against the shoulder 24 of the fitting.

Due to the fact that the ring has a slight clearance which permits rotation upon the shoulder 24 the ring finds its seat against the beveled face 14 of the bore and the fitting turns within the ring. Some burnishing action occurs between the fitting and the ring as the fitting is threaded into the bore and rotates within the ring. Should leakage occur between the inner circumference of the ring and the unthreaded face of the fitting, such leakage is further blocked by the seal formed between the end face 32 of the ring and the flat face 34 of the fitting. Seating of the ring upon the unthreaded length of the fitting inhibits vibration or collapse of the ring and also tends to prevent build-up of pressure within the ring.

The construction shown in FIGS. 4 through 6 is the preferred modification as compared with the structure of FIGS. 1 through 3. In FIGS. 4 through 6 the unthreaded portion of the fitting exhibits uniform diameter throughout its length. The member which is provided with the port is similar but it is given the number 11. It has a threaded port 13 provided with a beveled entrance 15. The fitting is a tubular fitting as described in connection with FIGS. 1 through 3. It has an externally threaded length 17 adjacent to one end and an unthreaded length 19 adjacent to the inner end of the threaded length and disposed between such threaded length and an enlarged hex portion 21. The hex portion 21 exhibits a flat circumferential radially extending sealing face 23.

There is a ring which is similar to the ring 30 in FIG. 1 and is identified by the numeral 29. This ring 29 has an inner circumferential face 31 and an inner end face 33. The inner end face 33 is disposed substantially perpendicularly with respect to the inner circumferential face 31 of the ring as shown in the drawings. This ring has an outer beveled end face 35 which corresponds to the beveled face 15 of the entrance to the bore. This ring also has an inner beveled end face 37. The purpose of this beveled end face 37 is to cut away the area of the inner end face of the ring so that the inner end face 33 presents only a limited area of engagement with the circumferential sealing face 23 of the hex portion 21 of the fitting.

The ring shown in FIGS. 4 through 6 may be of the same general character as that shown in FIGS. 1 through 3. In other words, it may be a steel ring which is resilient, contractible and deformable. This ring has an initial inner diameter such that it may be passed over the threaded length 17 of the fitting onto the unthreaded length 19, as shown in FIG. 4. The ring is then swaged to bring it down against the unthreaded length. When the ring is released from the swaging die it will spring back slightly to the extent of perhaps .001" or .002" so as to be sufficiently free on the unthreaded length of the fitting as to permit relative rotation of the fitting within the ring. The ring is now captive upon the fitting in that while it is free for rotation thereupon it surrounds the unthreaded length so closely that it cannot be moved outwardly of the threaded length. This is shown in FIG. 5.

When the ring is waged inwardly against the unthreaded length of the fitting such swaging may result in a slight cocking of the ring so that its outer end is contracted to a greater degree than its inner end. This is shown in FIG. 5. It is exaggerated in FIG. 5 because it might be to a very slight extent. Because of this cocking the inner circumferential face of the ring is not shown in FIG. 5 as parallel to the unthreaded length 19 of the fitting. The swaging, however, might be carried out in such a manner that the inner circumferential face of the ring would be substantially parallel to the opposed unthreaded length of the fitting.

When the fitting is threaded into the port of the member the ring is wedged between the beveled face 15 of the port, the radial sealing face 23 of the hex, and the unthreaded length of the fitting. The ring forms a tight seal with the beveled entrance of the port and with the flat circumferential sealing face 23 of the hex portion of the fitting. The ring seats and also seals against the unthreaded length of the fitting. The ring is therefore sealed against the unthreaded length of the fitting and against the circumferential sealing face 23 of the fitting and against the beveled face of the port, forming a protective and tight seal against the escape of fluid under pressure from the system.

What I claim is:

1. A fluid pressure coupling for use with a member provided with a port having an inner threaded portion and an outer unthreaded outwardly bevelled entrance surface encircling the entrance to the threaded portion comprising: a tubular fitting having a threaded length adjacent one end and having a circumferential radially outwardly extending sealing surface spaced axially from said threaded length by an unthreaded length of less diameter than the threaded length; a resilient and resistingly deformable continuous sealing ring of solid generally trapezoidal shape in cross section encircling said unthreaded length and preswaged radially inwardly thereabout throughout the axial dimension of the ring from an initial internal diameter sufficient to be passed over the threaded length to a captive internal diameter less than the crest diameter of such threaded length but sufficiently greater than the diameter of the unthreaded length to allow relative rotation therebetween; such ring having an inner end face opposed to said radially outwardly extending sealing surface of the fitting to abut the same, and having an outer end face disposed at the opposite end of the ring from the inner end face and extending radially outwardly from said internal captive diameter of the ring, and a radially disposed external bevelled face extending substantially from said outer to said inner end face and bevelled to conform substantially to the bevelled entrance of the port to abut the same, and said ring having a radially disposed smooth internal cylindrical face extending axially of the ring from the inner end to the outer end faces thereof and opposed to and adapted to abut the unthreaded length when the fitting is tightened into the port, said ring being resistingly resiliently contractable and deformable to have its internal cylindrical face throughout substantially its entire axial dimension diametrically contracted from said captive internal diameter into flush circumferential sealing engagement about the unthreaded length and to have its bevelled external face circumferentially wedged flush against the bevelled surface of the entrance of the port when the inner end face of the ring is engaged with the circumferential sealing surface of the fitting and the fitting is threaded into the port compressing the ring circumferentially against the bevelled surface of the port entrance, said ring being sufficiently resilient when released from said compression to spring back away from the unthreaded length of the fitting diametrically expanding its internal cylindric smooth face to its captive internal diameter sufficient to allow relative rotation between the fitting and the ring, and at least one of said radially disposed faces of the ring which is opposed to and adapted to abut an opposed surface to establish a seal therebetween lying on an angle with respect to such opposed surface whereby tightening of the fitting into the port as aforesaid to bring such angularly related surfaces into flush sealing relationship will impose a twisting tension on the ring about its circumferential axis of mass.

2. The invention as defined in claim 1 characterized in that said radially disposed face of the ring which is angularly related to the opposed surface against which it seals is the internal cylindrical face opposed to the unthreaded length of the fitting, and the axially outer end of such face adjacent the outer end face of the ring is of a lesser diameter than the diameter of such face adjacent the inner end of the ring.

3. A fluid pressure coupling as defined in claim 2 characterized in that the end face of the sealing ring opposed to the circumferential sealing face portion of the fitting is cut away so as to bear against the sealing face portion of the fitting throughout a distance less than the radial dimension of the ring.

4. A fluid pressure coupling as defined in claim 1 characterized in that the unthreaded length of the fitting has a shoulder portion adjacent to the circumferential sealing face portion which shoulder portion is of greater diameter than the portion of the unthreaded length adjacent to the threaded length of the fitting and the sealing ring is mounted upon said shoulder portion of greater diameter.

5. A fluid pressure coupling as defined in claim 1 characterized in that the unthreaded length of the fitting has a shoulder portion adjacent to the circumferential sealing face portion which shoulder portion is of greater diameter than the portion adjacent to the threaded length of the fitting and the sealing ring is mounted upon the portion of greater diameter, and characterized further in that the shoulder portion of greater diameter is provided with an outwardly radially projecting ridge adjacent to the portion of less diameter and which ridge has a greater external diameter than the internal diameter of the ring mounted upon the shoulder but less than the external diameter of the ring.

References Cited in the file of this patent

UNITED STATES PATENTS

| 755,994 | Boome | Mar. 29, 1904 |
| 906,099 | Burgess | Dec. 8, 1908 |
| 980,939 | Glauber | Jan. 10, 1911 |
| 1,393,057 | Vollmer | Oct. 11, 1921 |
| 1,634,655 | Elstone | July 5, 1927 |
| 1,799,246 | Recker | Apr. 7, 1931 |
| 1,936,815 | Wilkinson | Nov. 28, 1933 |
| 2,181,343 | Reimschissel | Nov. 28, 1939 |
| 2,305,590 | Marburg | Dec. 22, 1942 |
| 2,330,130 | Marburg | Sept. 21, 1943 |
| 2,343,235 | Bashark | Feb. 29, 1944 |
| 2,413,879 | Maky | Jan. 7, 1947 |
| 2,541,141 | Woodling | Feb. 13, 1951 |
| 2,704,676 | Harding | Mar. 22, 1955 |
| 2,826,438 | Woodling | Mar. 11, 1958 |
| 2,942,895 | Lyon | June 28, 1960 |
| 3,003,795 | Lyon | Oct. 10, 1961 |

FOREIGN PATENTS

| 198,232 | Switzerland | June 15, 1938 |
| 649,677 | Great Britain | Jan. 31, 1951 |
| 283,167 | Switzerland | Sept. 16, 1952 |

OTHER REFERENCES

Parker Catalog No. 903, by Parker Appliance Company, 17325 Euclid Ave., Cleveland 12, Ohio, August 1950, page 44, 285–O-ring.